US008256956B2

(12) United States Patent
Suzuki et al.

(10) Patent No.: US 8,256,956 B2
(45) Date of Patent: Sep. 4, 2012

(54) TEMPERATURE SENSOR

(75) Inventors: Tatsuya Suzuki, Nagoya (JP);
Mitsunori Oi, Kasugai (JP); Takashi Maeda, Kakamigahara (JP); Norimichi Saito, Aichi (JP); Toshinori Nishi, Komaki (JP); Go Hanzawa, Kitanagoya (JP); Takeshi Morita, Kitanagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 405 days.

(21) Appl. No.: 12/437,646

(22) Filed: May 8, 2009

(65) Prior Publication Data
US 2009/0279586 A1 Nov. 12, 2009

(30) Foreign Application Priority Data
May 9, 2008 (JP) .................................. 2008-123025

(51) Int. Cl.
*G01K 1/08* (2006.01)
*G01K 7/16* (2006.01)

(52) U.S. Cl. ......................... 374/185; 374/163; 374/208

(58) Field of Classification Search .................. 374/100, 374/163, 183, 179, 208, 144, 141, 185; 136/200; 73/866.5
See application file for complete search history.

(56) References Cited

U.S. PATENT DOCUMENTS

| | | | | |
|---|---|---|---|---|
| 4,018,624 A | * | 4/1977 | Rizzolo | 136/233 |
| 4,453,835 A | * | 6/1984 | Clawson et al. | 374/185 |
| 4,485,263 A | * | 11/1984 | Itoyama et al. | 136/230 |
| 4,984,904 A | * | 1/1991 | Nakano et al. | 374/139 |
| 5,348,395 A | * | 9/1994 | Corr et al. | 374/135 |
| 5,662,418 A | * | 9/1997 | Deak et al. | 374/144 |
| 5,678,926 A | * | 10/1997 | Stansfeld et al. | 374/208 |
| RE35,674 E | * | 12/1997 | Pustell | 136/231 |
| 5,864,282 A | * | 1/1999 | Hannigan et al. | 338/30 |
| 5,999,081 A | * | 12/1999 | Hannigan et al. | 338/28 |
| 6,264,363 B1 | | 7/2001 | Takahashi et al. | |
| 6,536,950 B1 | * | 3/2003 | Green et al. | 374/179 |
| 6,762,671 B2 | * | 7/2004 | Nelson | 338/25 |
| 6,776,524 B2 | * | 8/2004 | Park et al. | 374/179 |
| 6,899,457 B2 | * | 5/2005 | Kurano | 374/185 |
| 7,060,949 B1 | * | 6/2006 | Davis et al. | 219/536 |
| 7,458,718 B2 | * | 12/2008 | Krishnamurthy et al. | 374/208 |

(Continued)

FOREIGN PATENT DOCUMENTS

DE 102004033958 A1 2/2006

(Continued)

*Primary Examiner* — Gail Verbitsky
(74) *Attorney, Agent, or Firm* — Sughrue Mion, PLLC

(57) ABSTRACT

A temperature sensor including a temperature sensing element (102) having a temperature sensing unit (103) and a pair of device electrode wires (104) extending from the temperature sensing unit; a sheath member (106) including a sheath wire (108) connected at a junction (110) to one of the device electrode wires and a sheath outer pipe (107) retaining the sheath wire in an insulating material (114); an inner tube (112) which has a bottomed cylindrical shape, the inner tube accommodating the temperature sensing element and the junction in a bottom portion side of the inner tube serving as a leading end of the temperature sensor, and extending in an extension direction of the device electrode wire and the sheath wire; and an outer tube (120) which has a bottomed cylindrical shape including a gas inlet hole (122a, 122b, 122c), the outer tube covering the inner tube, and being spaced, from the inner tube on a leading end side of the junction when viewed in a direction perpendicular to an axial direction of the inner tube.

5 Claims, 7 Drawing Sheets

U.S. PATENT DOCUMENTS

| | | |
|---|---|---|
| 7,507,024 B2 | 3/2009 | Takahashi |
| 7,740,403 B2 * | 6/2010 | Irrgang et al. ............... 374/185 |
| 7,841,769 B2 * | 11/2010 | Ma et al. ..................... 374/147 |
| 8,092,086 B2 | 1/2012 | Suzuki et al. ................ 374/208 |
| 8,192,081 B2 * | 6/2012 | Suzuki et al. ................ 374/163 |
| 2002/0090019 A1 * | 7/2002 | Marto et al. ................. 374/185 |
| 2004/0101028 A1 * | 5/2004 | Iwaya et al. ................. 374/163 |
| 2004/0218662 A1 * | 11/2004 | Hanzawa et al. ............. 374/185 |
| 2006/0013282 A1 * | 1/2006 | Hanzawa et al. ............. 374/163 |
| 2007/0104247 A1 * | 5/2007 | Takahashi .................... 374/185 |
| 2007/0261473 A1 | 11/2007 | Weyl et al. |
| 2008/0271549 A1 * | 11/2008 | Endres et al. ................ 73/866.5 |
| 2009/0064663 A1 * | 3/2009 | Ma et al. ....................... 60/277 |
| 2010/0139364 A1 * | 6/2010 | Kume et al. ................. 73/23.31 |

FOREIGN PATENT DOCUMENTS

| | | |
|---|---|---|
| JP | 58-55727 A | 4/1983 |
| JP | 5-264368 A | 10/1993 |
| JP | 2000-97781 A | 4/2000 |
| JP | 2000-266609 A | 9/2000 |
| JP | 2006170692 | 6/2006 |
| JP | 2007-155702 | 6/2007 |

* cited by examiner

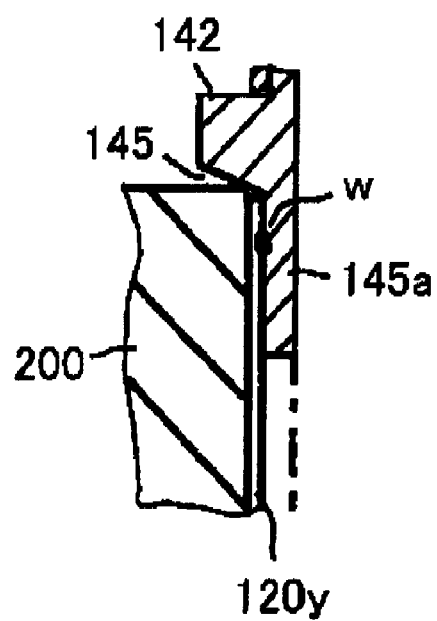 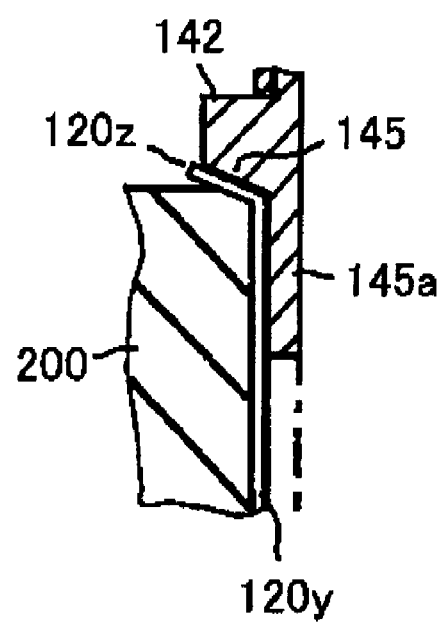
FIG. 4 (a)    FIG. 4 (b)

TEMPERATURE SENSOR

BACKGROUND OF THE INVENTION

1. Field of the Invention

The present invention relates to a temperature sensor having a temperature sensing element such as a thermistor and a Pt resistance thermometer.

2. Description of the Related Art

As a temperature sensor for detecting temperature of exhaust gas of a vehicle or the like, a thermistor, a Pt resistance thermometer, or the like based on a change in resistance with changing temperature has been known (refer to Patent Documents 1 and 2).

A configuration of this type of temperature sensor is illustrated in FIG. 7. As illustrated in the upper cross-sectional FIG. 7, a temperature sensor 500 is configured by welding and accommodating a thermistor 502 and a sheath member 506 in a metal tube 512 and filling a cement 514 such as alumina through a gap in the metal tube 512.

The thermistor 502 includes a thermistor sintered body 503 and a device electrode wire 504. Since the device electrode wire 504 is a Pt—Rh wire or the like which is expensive, the low-cost sheath member 506 is connected for a reduction in cost. Here, the sheath member 506 includes an insulated sheath wire 508 made of SUS and the like and retained by a sheath tube 507, and the device electrode wire 504 and the sheath wire 508 are joined through a junction 510 by laser spot welding.

[Patent Document 1] JP-A-Hei5-264368 (FIG. 1, Paragraph 0010)
[Patent Document 2] JP-A-2000-97781

3. Problems to be Solved by the Invention

However, the temperature of exhaust gas changes rapidly between a low temperature of about 0° C. and a high temperature of about 1000° C., and accordingly a thermal cycle of raising/decreasing a temperature within the temperature range is also applied to the temperature sensor.

In addition, when the temperature sensor is rapidly cooled from a high temperature to a low temperature, cooling starts from the metal tube 512 on an outer periphery side. Here, the metal tube 512 such as stainless steel has a thermal expansion coefficient greater than that of the inside cement (alumina or the like) 514. Accordingly, as illustrated in the lower cross-section of FIG. 7, when the metal tube 512 starts cooling and contracts, contraction of the cement 514 cannot follow that of the metal tube 512. Consequently, a leading end portion (on a side of the thermistor 502) of the metal tube 512 presses the adjacent cement 514 and the thermistor 502 rearward (along an arrow A). When the thermistor 502 is pressed rearward (on a side of the sheath member) as described above, a shear stress as shown by arrows B is exerted on the junction 510 of the device electrode wire 504 and the sheath wire 508. In addition, whenever the thermal cycle is repeated, the shear stress is exerted on the junction 510, strength of the junction 510 is reduced, and there is a concern that a break in the junction 510 may occur.

In addition, a sensor disclosed in Patent Document 1 has a configuration in which a thermistor is accommodated in a double tube having an inner pipe 4 and a metal tube 5. In this case, leading ends of the inner pipe 4 and the metal tube 5 are fixed by a TIG (Tungsten Inert Gas) welding portion 15, so that the entire tube also contracts and the thermistor is, pressed rearward.

SUMMARY OF THE INVENTION

It is therefore an object of the invention to provide a temperature sensor capable of lessening stress exerted on a junction of a device electrode wire and a sheath wire of a temperature sensing element.

According to a first aspect (1), the above object of the invention has been achieved by providing a temperature sensor including: a temperature sensing element having a temperature sensing unit and a pair of device electrode wires extending from the temperature sensing unit; a sheath member including a sheath wire connected at a junction to at least one of the device electrode wires and a sheath outer pipe retaining the sheath wire in an insulating material; an inner tube made of a metal which has a bottomed cylindrical shape, said inner tube accommodating the temperature sensing element and the junction in a bottom portion side of the inner tube serving as a leading end of the temperature sensor, and extending in an extension direction of the device electrode wire and the sheath wire; and an outer tube which has a bottomed cylindrical shape including a gas inlet hole, said outer tube covering the inner tube, and being spaced from the inner tube on a leading end side of the junction when viewed in a direction perpendicular to an axial direction of the inner tube.

With such a configuration, the inner tube is shielded by the outer tube. Accordingly, when the temperature sensor is rapidly cooled from a high temperature to a low temperature, cooling starts from the outer tube on an outer periphery side, and the outer tube contracts. However, the inner tube resists the rapid temperature change because it is shielded by the outer tube. In addition, since the outer tube is spaced from the inner tube on a leading end side of the junction, the contraction of the outer tube due to the rapid temperature change is not followed by the inner tube, and the degree of contraction of the inner tube can be reduced. Particularly, since the junction is shielded by the outer tube, stress such as a shear stress exerted on the junction due to contraction of the inner tube with changing temperature can be lessened.

In addition, since the outer tube is provided with gas inlet holes at predetermined positions, the inner tube is exposed to the gas to be measured, respondence of the temperature sensing unit including a leading end thereof is maintained, and the temperature of the gas to be measured can be detected with good precision.

Moreover, since the junction is shielded by the outer tube, the temperature change in the vicinity of the junction can be smoothened, and thermal stress exerted on the junction can be reduced, thereby further enhancing reliability of the temperature sensor.

In a preferred embodiment (2), the temperature sensor according to (1) above further comprises a fixing portion for fixing the outer tube to the inner tube or the sheath outer pipe on a rear end side of the junction when viewed in a direction perpendicular to the axial direction of the inner tube.

With such a configuration, the outer tube can be fixed on the rear end side of the junction, and the contraction of the inner tube following contraction of the outer tube due to a rapid temperature change can be effectively prevented.

In another preferred embodiment (3) of the temperature sensor according to (1) or (2) above, the entire portion of the gas inlet hole is disposed on a leading end side of the junction when viewed in a direction perpendicular to the axial direction of the inner tube.

With such a configuration, the junction is completely shielded by the outer tube, so that the temperature change of the junction and stress exerted thereon can be further lessened.

In yet another preferred embodiment (4) of the temperature sensor according to any of (1) to (3) above, at least a portion of the gas inlet hole overlaps the temperature sensing unit when viewed in a direction perpendicular to the axial direction of the inner tube.

With such a configuration, the gas inlet hole at least partially overlaps the temperature sensing unit. From the gas inlet hole(s), the gas to be measured (exhaust gas) flows to contact the inner tube in the vicinity of the temperature sensing unit, thereby further enhancing the respondence of the temperature sensing unit.

In yet another preferred embodiment (5) of the temperature sensor according to any of (1) to (4) above, the insulating material is filled between the temperature sensing element and an inner surface of the inner tube.

With such a configuration, heat is rapidly transferred from the inner tube to the temperature sensing element, thereby further enhancing the respondence of the temperature sensing element.

Thus, in accordance with the invention, the stress exerted on the junction of the device electrode wire of the temperature sensing element and the sheath wire can be lessened, and a break in the junction can be prevented.

BRIEF DESCRIPTION OF THE DRAWINGS

Illustrative aspects of the invention will next be described in detail with reference to the following figures wherein:

FIGS. 4(a) and 4(b) are partial cross-sectional views illustrating a fixed state of an outer tube in the temperature sensor according to the second embodiment of the invention;

DETAILED DESCRIPTION OF THE PREFERRED EMBODIMENTS

Hereinafter, exemplary embodiments of the invention will be described with reference to the drawings. However, the present invention should not be construed as being limited thereto.

Figure 1:
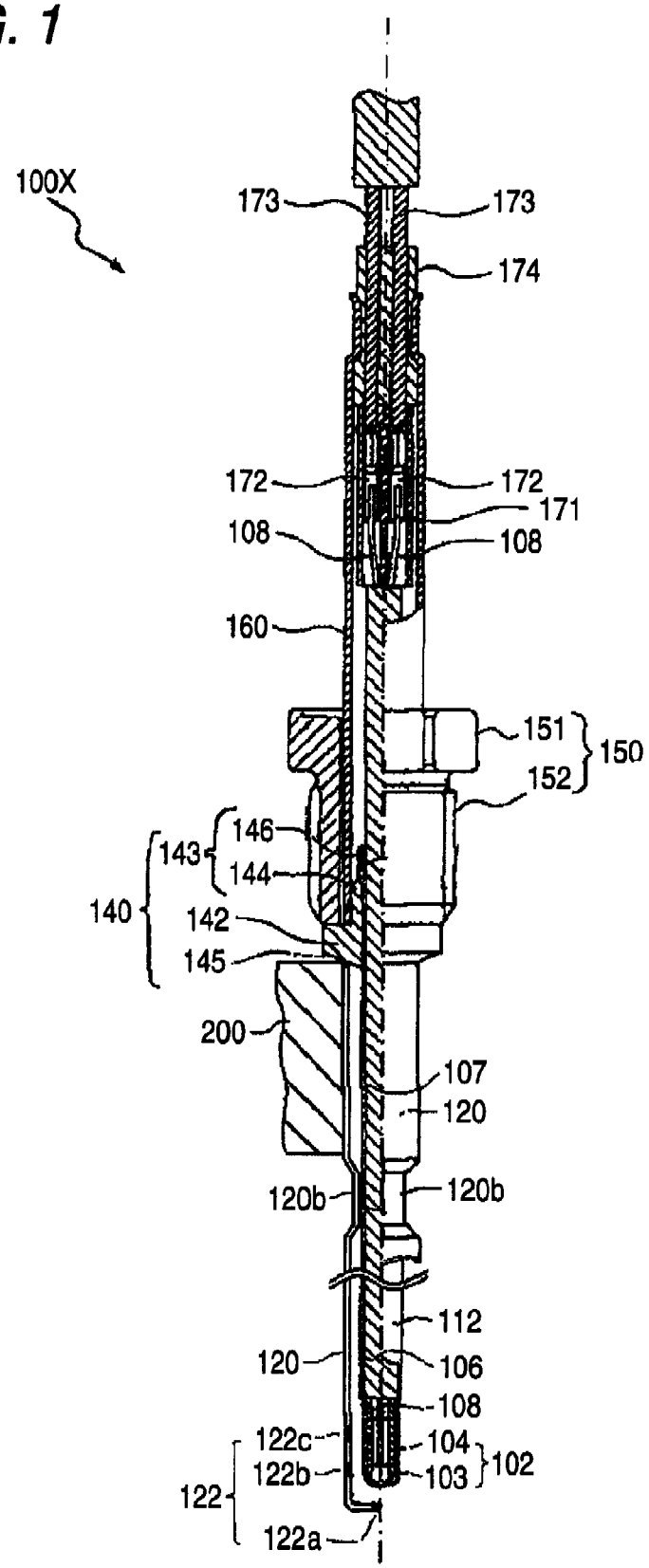
FIG. 1 is a cross-sectional view illustrating a configuration of a temperature sensor that is partially cut away, according to a first embodiment of the invention.

FIG. 1 illustrates a cross-sectional configuration of a temperature sensor 100x that is partially cut away, according to a first embodiment of the invention. The temperature sensor 100x is inserted through an opening of a side wall 200 of an exhaust pipe to be mounted therein, and detects the temperature of a vehicle exhaust gas. In addition, as the temperature of the exhaust gas changes rapidly between a low temperature of about 0° C. and a high temperature of about 1000° C., a thermal cycle of raising/decreasing the temperature within the temperature range is applied to the temperature sensor 100x.

The temperature sensor 100x includes a thermistor (temperature sensing element) 102, a sheath member 106 connected to the thermistor 102, an inner tube 112 made of a metal (SUS310S is used in this embodiment) which has a bottomed cylindrical shape accommodating the thermistor 102 and the sheath member 106, an outer tube 120 made of a metal (SUS310S is used in this embodiment) which is aligned coaxially with the inner tube 112 and has a bottomed cylindrical shape covering the inner tube 112, a flange member 140 fitted to an outer periphery of the inner tube 112, a mounting member 150 loosely fitted to an outer periphery of the flange member 140, a cylindrical joint 160 made of a metal which is mounted to a rear end side of the flange member 140, and an elastic seal member 174 which is mounted to a rear end of the joint 160 to pull out a lead 173.

In the temperature sensor 100x of this embodiment, a lower end side of the inner tube 112 is referred to as a "leading end," and an open end side of the inner tube 112 is referred to as a "rear side."

The thermistor (temperature sensing element) 102 includes a thermistor sintered body (temperature sensing unit) 103 for measuring temperature and a pair of device electrode wires 104 extending from an end (rear end side) of the thermistor sintered body 103.

The thermistor sintered body 103 has a hexagonal prism shape, provided in the inner tube 112 while an axial direction of the prism is perpendicular to an axial direction of the inner tube 112. As the thermistor sintered body 103, a perovskite-structured oxide having $(Sr,Y)(Al,Mn,Fe)O_3$ as a base composition may be used, but is not limited thereto. In addition, as the temperature sensing unit, a resistance thermometer such as Pt in addition to the thermistor may be used.

The sheath member 106 includes a sheath wire 108 connected to each of the pair of device electrode wires 104 of the thermistor 102, and a sheath outer pipe 107 accommodating the sheath wire 108. An insulating material made of $SiO_2$ is filled between the sheath wire 108 and an inner surface of the sheath outer pipe 107.

Typically, the device electrode wire 504 is a Pt—Rh wire or the like that is expensive. Therefore, by connecting a sheath wire 108 made of SUS or the like which is inexpensive, a reduction in cost can be achieved.

The flange member 140 has a substantially cylindrical shape in which a center hole through which the inner tube 112 is to be inserted opens in an axial direction. From the leading end side of the temperature sensor 100x, a flange portion 142 having a large diameter, a tubular sheathing portion 143 having a smaller diameter than the flange portion 142, a first stepped portion 144 defining a leading end side of the sheathing portion 143, and a second stepped portion 146 which defines a rear end side of the sheathing portion 143 and has a smaller diameter than the first stepped portion 144, are sequentially formed. A leading end surface of the flange portion 142 is provided with a tapered seating surface 145, and when the mounting member 150 described below is screwed to the exhaust pipe, the seating surface 145 is mounted to the side wall 200 of the exhaust pipe for sealing.

The flange member 140 is press-fitted to a rear end portion of the inner tube 112, and the entire periphery of the second stepped portion 146 and the inner tube 112 are fixed to each other by laser welding.

In addition, the joint 160 is press-fitted to an outer periphery of the first stepped portion 144, and the two are fixed to each other by laser-welding the entire periphery. The joint 160 covers the inner tube 112 on a rear end side by the flange member 140, and accommodates and retains a connection portion of the sheath wire 108 pulled from the sheath member 106 of the inner tube 112, and the lead 173.

The mounting member 150 has a center hole with a diameter slightly larger than the outer periphery of the joint 160 in an axial direction and is provided with a screw portion 152 and a hexagonal nut portion 151 having a diameter larger than that of the screw portion 152, from a leading end side. In addition, while a rear surface of the flange portion 142 of the flange member 140 comes in contact with a front surface of the screw portion 152, the mounting member 150 is loosely fitted to the outer periphery of the flange member 140 (the joint 160) and is rotatable in the axial direction.

In addition, by screwing the screw portion 152 to a predetermined screw hole of the exhaust pipe, the temperature sensor 100x is mounted to the side wall 200 of the exhaust pipe.

The outer tube 120 is bottomed-cylindrical, and the bottom portion thereof covers the inner tube 112 toward a leading end side of the inner tube 112. The outer tube 120 is crimped at a substantially center position of a portion of the inner tube 112 disposed on a leading end side of the flange member 140 to form a crimping portion (fixing portion) 120b and so as to be fixed to the inner tube 112. A bottom surface and side surfaces of the outer tube 120 are provided with a plurality of gas inlet holes 122 (122a to 122c) described below, and a rear end of the outer tube 120 extends to a position substantially contacting the seating surface 145 of the flange portion 142.

In addition, a diameter of the opening of the side wall 200 of the exhaust pipe is slightly larger than an outside diameter of the outer tube 120 such that the outer tube 120 is accommodated in the opening of the side wall 200.

From a rear end of the sheath outer pipe 107 of the sheath member 106, the two sheath wires 108 are pulled, and an end of each sheath wire 108 is connected to a tightening terminal 172. The tightening terminal 172 is connected to the lead 173. In addition, each of the sheath wires 108 and the tightening terminal 172 is insulated by an insulating tube 171.

In addition, each lead 173 is pulled out through a lead insertion hole of the elastic seal member 174 fitted to a rear end inner side of the joint 160 and connected to an external circuit through a connector.

Next, the outer tube 120 is described with reference to FIG. 2 that is a partially enlarged view of FIG. 1. In addition, FIG. 2 illustrates a cross-section taken in an axial direction of the temperature sensor to include one of the two device electrode wires.

Figure 2:
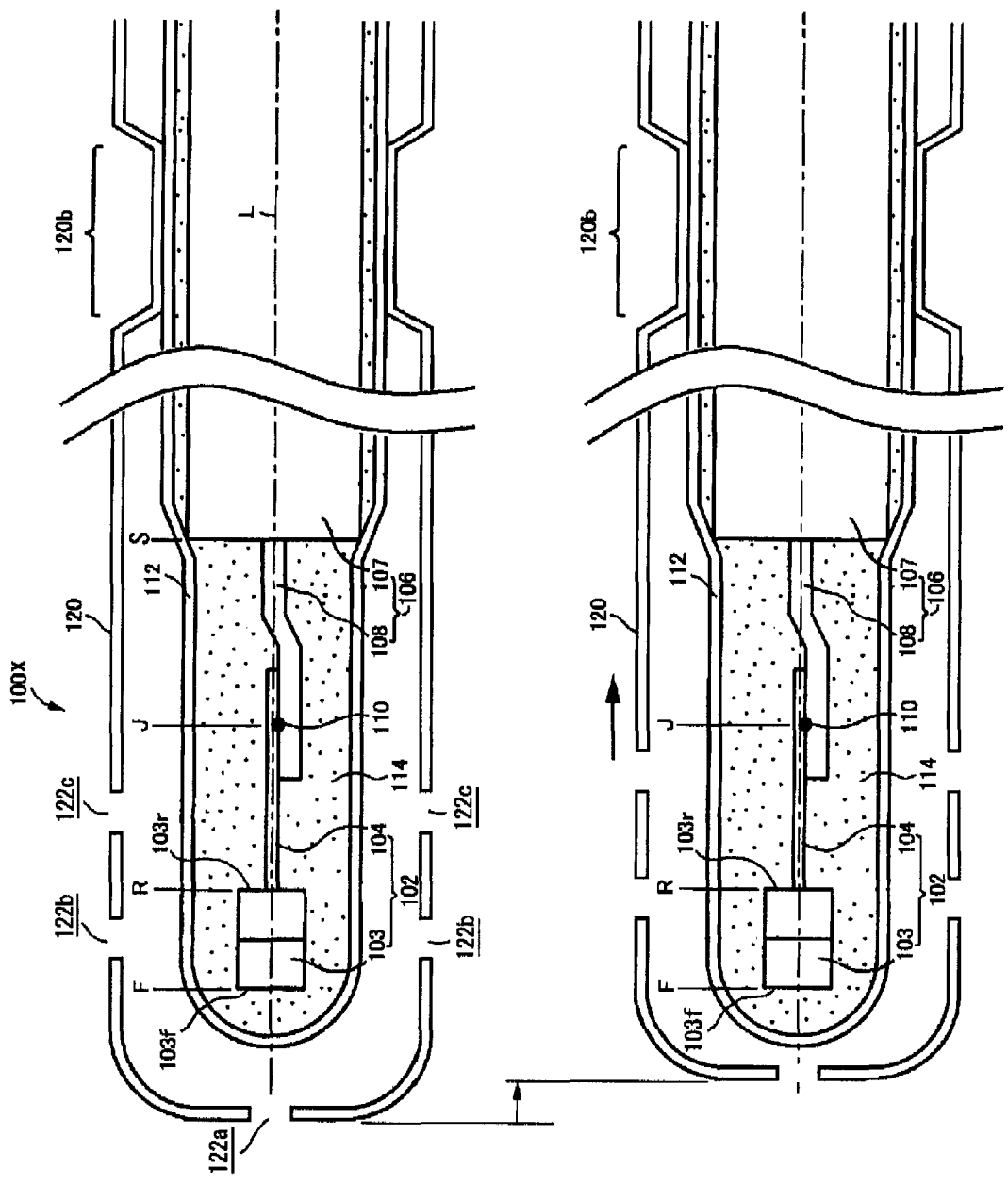
FIG. 2 is a partially enlarged view of FIG. 1 (upper cross-section), and a lower cross-section showing contraction of outer tube 120 upon cooling.

In FIG. 2, the thermistor 102 is disposed in an internal space of a bottom portion (leading end side) of the inner tube 112, and the device electrode wire 104 extends from a rear end 103r of the thermistor sintered body 103 along the axial direction L of the inner tube 112. In addition, the sheath outer pipe 107 of the sheath member 106 is accommodated in the inner tube 112 coaxially with the inner tube 112, and the sheath wire 108 pulled from a leading end of the sheath outer pipe 107 of the sheath member 106 overlaps with a leading end of the device electrode wire 104.

In addition, an overlapping portion of the device electrode wire 104 and the sheath wire 108 is formed as a junction 110 by laser spot welding, and the two are joined at the junction 110. The thermistor 102 and the sheath member 106 are connected as described above to be accommodated in the inner tube 112, and the insulating material 114 fills a space, so that the thermistor 102 and the sheath member 106 are retained in the inner tube 112. The insulating material 114 may be formed by filling and solidifying an unconsolidated cement having alumina and silica as a main constituent and an aggregate, respectively, in the space.

Here, when viewed in a direction perpendicular to the axial direction L of the inner tube 112, a leading end of the junction 110 is denoted by J, a position of the rear end 103r of the thermistor sintered body 103 is denoted by R, and a position of a leading end 103f of the thermistor sintered body 103 is denoted by F.

In this case, the outer tube 120 is spaced from the inner tube 112 on a leading end side of the position J.

When tie outer tube 120 is configured as described above, the inner tube 112 (including the junction 110) is shielded by the outer tube 120. Accordingly, when the temperature sensor 100x is rapidly cooled from a high temperature to a low temperature, cooling starts from the outer tube 120 on an outer periphery side. In addition, as illustrated in lower FIG. 2, although the outer tube 120 contracts, the inner tube 112 shielded by the outer tube 120 is resistant to the rapid temperature change. Moreover, since the outer tube 120 is spaced from the inner tube 112 on the leading end side from the junction 110, contraction of the outer tube 120 due to the rapid temperature change is not followed by the inner tube 112, and the degree of contraction of the inner tube 112 can be reduced. Particularly, since the junction 110 (position J) is shielded by the outer tube 120, stress such as shear stress exerted on the junction 110 which is caused by the contraction of the inner tube 112 with a change in temperature can be lessened.

In addition, since the outer tube 120 is provided with gas inlet holes 112 at predetermined positions so as to expose the inner tube 112 to the exhaust gas, respondence of the thermistor sintered body (temperature sensing unit) 103 included in the inner tube 112 is not deteriorated, and the temperature of the exhaust gas can be measured with good precision.

In addition, since the junction 110 is shielded by the outer tube 120, the temperature change in the vicinity of the junction 110 can be smoothened, and thermal stress exerted on the junction 110 can be reduced, thereby further enhancing reliability of the temperature sensor.

In addition, in this embodiment, the outer tube 120 is fixed to the inner tube 112 by the tightening portion 120b on a rear end side from the position J. When a fixing position of the inner tube 112 and the outer tube 120 is on the rear end side of the position J, the contraction of the inner tube 112 following the contraction of the outer tube 120 due to the rapid temperature change can be effectively prevented. Particularly, the fixing position of the inner tube 112 and the outer tube 120 is more preferably on a rear end side of the position S.

In addition, the rear end of the outer tube 120 needs to extend at least to a rear end (position S) of the sheath wire 108 (the sheath wire 108 taken out of the leading end of the sheath outer pipe 107) extending from the junction 110.

In addition, in his embodiment, when viewed in a direction perpendicular to the axial direction L of the inner tube 112, all of the gas inlet holes 122 (122a to 122c) are disposed on the leading end side of the junction 110 (position J). With such a configuration, the junction 110 can be completely shielded by the outer tube 120, so that stress such as shear stress exerted on the junction 110 due to contraction of the inner tube 112 with a change in temperature can further be lessened.

In addition, in this embodiment, when viewed in a direction perpendicular to the axial direction L of the inner tube 112, the gas inlet holes 122b are disposed between the position F and the position R. With such a configuration, the gas inlet holes at least partially overlap the thermistor sintered body (temperature sensing unit) 103, and from the gas inlet holes, the gas to be measured (exhaust gas) flows to contact the inner tube 112 in the vicinity of the temperature sensing unit 103, thereby further enhancing respondence of the temperature sensing unit 103.

In addition, in this embodiment, the insulating material 114 fills the space between the thermistor sintered body (temperature sensing unit) 103 and the inner tube 112, and the thermistor sintered body 103 and the inner tube 112 are formed integrally with one another. Accordingly, the extent of pressing the thermistor sintered body 103 to the rear side (sheath member side) when the inner tube 112 contracts with a change in temperature is increased, so as to exhibit the significant effects of this embodiment of the invention. In addition, when the insulating member fills the space between the thermistor sintered body 103 and the inner tube 112, heat is rapidly transferred from the inner tube 112 to the thermistor sintered body 103, thereby further enhancing the respondence of the thermistor sintered body 103.

Various configurations for retaining the thermistor sintered body 103 in the inner tube 112 include, in addition to the above-mentioned filling of the insulating material, a retaining configuration for retaining the thermistor sintered body 103 by disposing a holder in the vicinity of the thermistor sintered body 103 and filling the holder with an insulating material, a retaining configuration of allowing the thermistor sintered body 103 to come in contact with (be adhered to, or the like) a leading end inner wall or a side wall of the inner tube 112, or the like. In this embodiment of the invention, the above-mentioned retaining configuration is employed.

Figure 3:
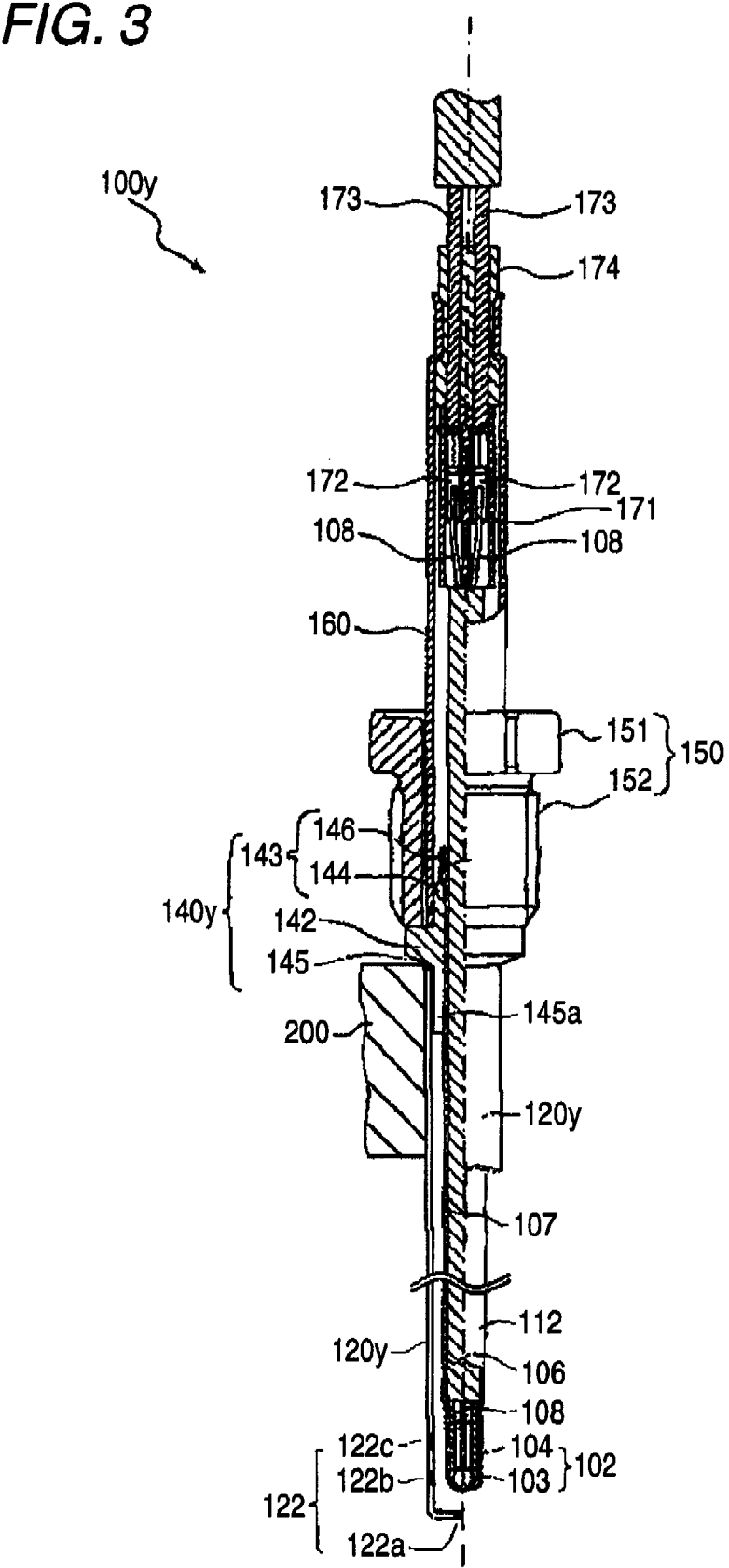
FIG. 3 is a cross-sectional view illustrating a configuration of a temperature sensor that is partially cut away, according to a second embodiment of the invention.

Next, a temperature sensor 100y according to a second embodiment of the invention will be described with reference to FIG. 3. FIG. 3 illustrates a cross-sectional configuration of the temperature sensor 100y that is partially cut away. The temperature sensor 100y is the same as that of the first embodiment, except that the configurations of a flange member 140y and an outer tube 120y differ from those of the first embodiment. Like elements in the first embodiment are denoted by like reference numerals, and a detailed description thereof will be omitted.

The temperature sensor 100y is different from that of the first embodiment in that outer tube 120y is not fixed by crimping to the inner tube 112, but rather by means of the flange member 140y. Specifically, a cylindrical guide portion 145a extends from the seating surface 145 formed on the leading end surface of the flange portion 142 of the flange member 140y toward the leading end side. The guide portion 145a has a center hole provided coaxially with the flange member 140y, and an outside diameter of the guide portion 145a is slightly larger than an inside diameter of the outer tube 120y.

In addition, as illustrated in FIG. 4, when the outer tube 120y is insert-fitted to the guide portion 145a and welded thereto, the outer tube 120y is fixed to the guide portion 145a with a welding portion w (FIG. 4(a)). The temperature sensor 100y configured as described above is mounted to the side wall 200 (of the exhaust pipe).

In addition, as a method of fixing the outer tube without welding, as illustrated in FIG. 4(b), a flange portion 120z is provided by increasing a diameter of a rear end of the outer tube 120y such that the rear end is along the seating surface 145. In this case, when the temperature sensor 100y is inserted into the side wall 200 (of the exhaust pipe) after insert-fitting the outer tube 120y to the guide portion 145a, the flange portion 120z is fitted and retained between the seating surface 145 and the side wall 200.

In addition, in the second embodiment illustrated in FIG. 4(a), the guide portion 145a serves as the fixing portion of the outer tube. In addition, in the second embodiment illustrated in FIG. 4(b), the seating surface 145 serves as the fixing portion of the outer tube, and when the temperature sensor 100y is mounted to an object, the seating surface 145 functions as the fixing portion.

Figure 5:
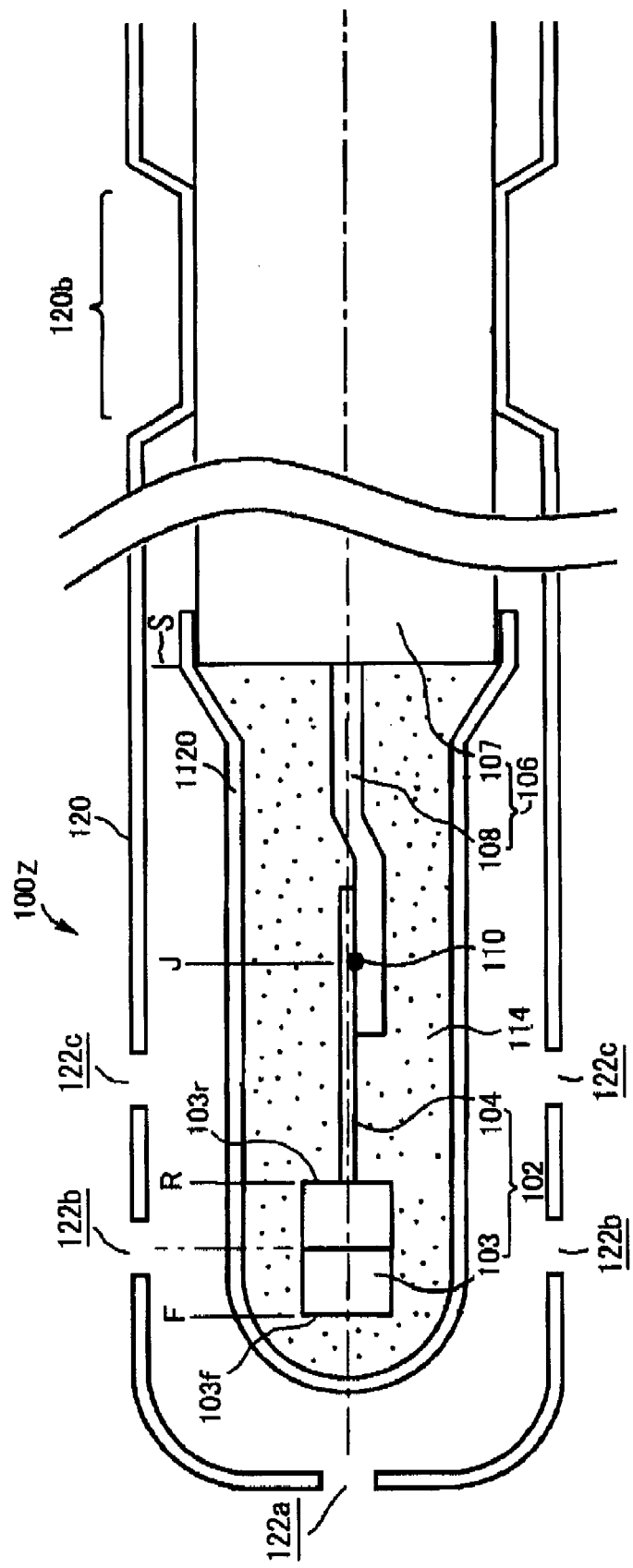
FIG. 5 is a partially enlarged view of a cross-section of a temperature sensor according to a third embodiment of the invention.

Next, a temperature sensor 100z according to a third embodiment of the invention will be described with reference to FIG. 5. FIG. 5 is a partially enlarged view corresponding to FIG. 2, and illustrates a cross-section taken in a direction parallel with an axial direction of the temperature sensor 100z to include one of the two device electrode wires 104. The temperature sensor 100z is the same as that of the first embodiment, except that a configuration of the inner tube 1120 is different. Like elements in the first embodiment are denoted by like reference numerals, and a detailed description thereof will be omitted. In addition, a configuration of parts not shown in FIG. 5 is the same as in FIG. 1.

In the temperature sensor 100z, the inner tube 1120 covers a region from the thermistor 102 to the position S, and the entire periphery thereof is laser-welded to the leading end of the sheath outer pipe 107 in the vicinity of the position S. In this manner, the inner tube 1120 is not present on a rear end side of the welding position so as to expose the sheath outer pipe 107. In addition, the outer tube 120 is tightened (tightening portion 120b) and fixed to the sheath outer pipe 107. Moreover, a rear end side of the sheath member 106 is inserted through the center hole of the flange member 140 and retained by the flange member 140.

The invention is not limited to the above embodiments, and various changes in form and detail of the invention as shown and described above can be made without departing from the spirit and scope of the claims appended hereto. For example, the material of the outer tube is not particularly limited, and various types of heat-resistant materials such as ceramics may be used in addition to the metal.

EXAMPLES

The temperature sensor illustrated in FIG. 1 was manufactured by a typical procedure and used as a basis for the Examples. Here, a configuration was employed in which the outside diameter of the outer tube 120 is 4.45 mm, a distance from a leading end of the outer tube 120 and a leading end of the inner tube 112 is 3 mm, and the rear end of the outer tube 120 extends to the leading end side of the flange member 140. In addition, at the surface of the outer tube 120, one gas inlet hole (with a diameter of 1.5 mm) was provided at a position corresponding to the gas inlet hole 122a of FIG. 2, four gas inlet holes (with a diameter of 1.5 mm) were provided at a position corresponding to the gas inlet hole 122b of FIG. 2 (providing an angle of 90° with respect to a radial direction), and similarly, four gas inlet holes (with a diameter of 1.5 mm) were provided at a position corresponding to the gas inlet hole 122c of FIG. 2.

As Comparative Example 1, a temperature sensor the same as that of the Example was manufactured, except that no outer tube 120 was provided so as to expose the inner tube.

As Comparative Example 2, a temperature sensor the same as that of the Example was manufactured, except that the outer tube 120 was not provided with gas inlet holes.

The temperature sensors of the Example and the Comparative Examples were mounted to a downstream side pipe of an electric furnace at a temperature of 600° C., and the temperature was measured while a flow rate in the pipe was set to 20 m/sec.

Figure 6:
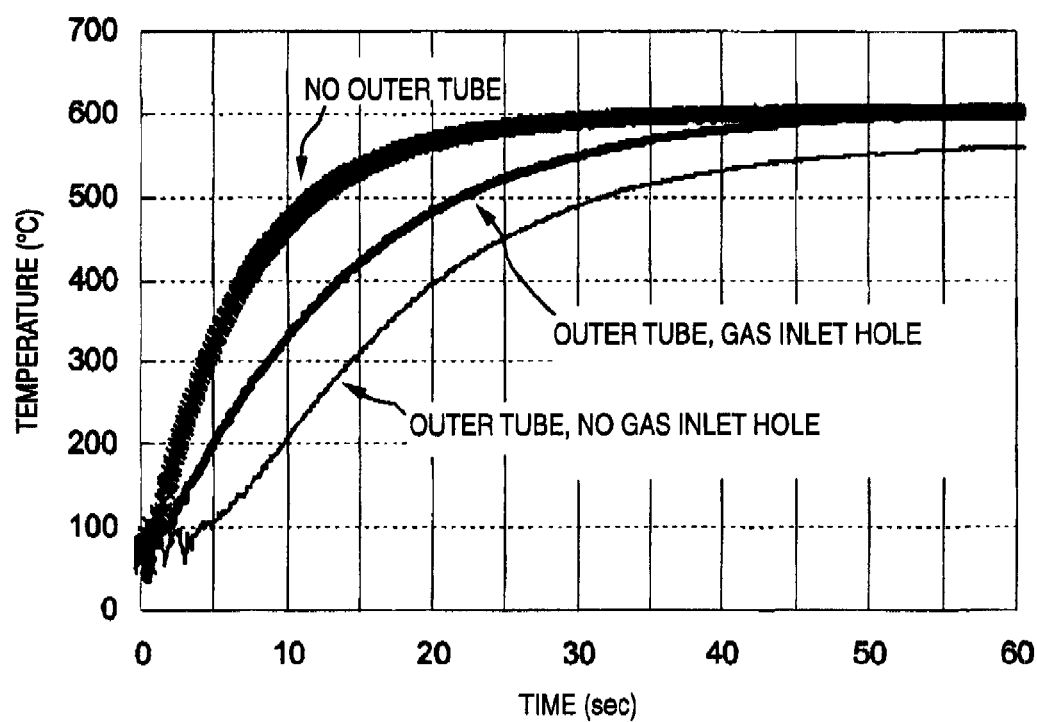
FIG. 6 is a view illustrating the temperature respondence of the temperature sensors of Example and Comparative Examples.
Figure 7:
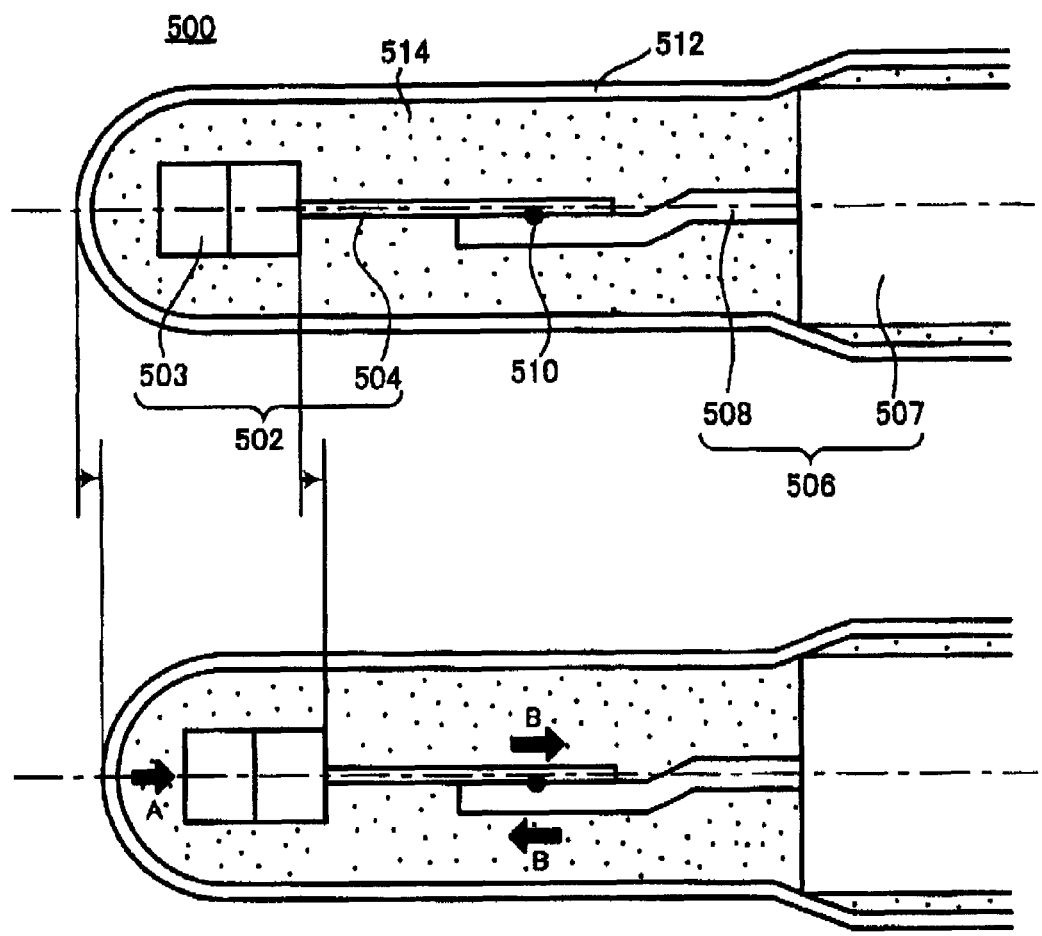
FIG. 7 is a partially enlarged view of a cross-section of a related art temperature sensor (upper cross-section), and a lower cross-section showing compressive force A and shear stress B acting on the sensor components upon cooling.

The results thus obtained are shown in FIG. 6. As shown in FIG. 6, due to the gas inlet holes provided in the outer tube, a temperature respondence close to that of the case where an outer tube is not provided was obtained, and due to the gas inlet holes, the inner tube was properly exposed to the gas to be measured.

This application is based on Japanese Patent Application No. 2008-123025, filed May 9, 2008, the disclosure of which is incorporated herein by reference in its entirety.

What is claimed is:

1. A temperature sensor comprising:
    a temperature sensing device having a temperature sensing unit and a pair of device electrode wires extending from the temperature sensing unit;
    a sheath member including a sheath wire connected at a junction to at least one of the device electrode wires and a sheath outer pipe retaining the sheath wire in an insulating material;
    an inner tube made of a metal which has a cylindrical shape having a closed bottom at a front end thereof, said inner tube accommodating the temperature sensing element and the junction in the closed bottom of the inner tube serving as a leading detecting end of the temperature sensor, and extending in an extension direction of the device electrode wire and the sheath wire; and
    an outer tube which has a cylindrical shape having a closed bottom at a front end thereof and including a gas inlet hole, said outer tube covering the inner tube, and being spaced from the inner tube frontward of the junction when viewed in a direction perpendicular to an axial direction of the inner tube,
    wherein the sheath member is disposed within the inner tube, and a front end of the sheath outer pipe is rearward of the junction.

2. The temperature sensor according to claim 1, further comprising a fixing portion for fixing the outer tube to the inner tube or the sheath outer pipe rearward of the junction when viewed in a direction perpendicular to the axial direction of the inner tube.

3. The temperature sensor according to claim 1, wherein the entire portion of the gas inlet hole is disposed frontward of the junction when viewed in a direction perpendicular to the axial direction of the inner tube.

4. The temperature sensor according to claim 1, wherein at least a portion of the gas inlet hole overlaps the temperature sensing unit when viewed in a direction perpendicular to the axial direction of the inner tube.

5. The temperature sensor according to claim 1, wherein the insulating material is filled between the temperature sensing element and an inner surface of the inner tube.

* * * * *